(12) United States Patent
Hamilton et al.

(10) Patent No.: US 9,971,796 B2
(45) Date of Patent: May 15, 2018

(54) OBJECT STORAGE USING MULTIPLE DIMENSIONS OF OBJECT INFORMATION

(71) Applicant: Amazon Technologies, Inc., Reno, NV (US)

(72) Inventors: James R. Hamilton, Seattle, WA (US); Alyssa H. Henry, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 33 days.

(21) Appl. No.: 13/870,772

(22) Filed: Apr. 25, 2013

(65) Prior Publication Data
US 2014/0324920 A1  Oct. 30, 2014

(51) Int. Cl.
*G06F 17/30* (2006.01)
*G06F 3/06* (2006.01)

(52) U.S. Cl.
CPC ...... *G06F 17/30312* (2013.01); *G06F 3/0605* (2013.01); *G06F 3/0649* (2013.01); *G06F 3/0685* (2013.01); *G06F 17/30592* (2013.01)

(58) Field of Classification Search
CPC ........... G06F 11/1461; G06F 17/30312; G06F 17/30174
USPC ......... 711/162, 161, 170, E12.001, E12.103, 711/111, 165, E12.008, E12.057, 103, 711/114, 117, 137, 156, 202, 203, 4; 707/E17.01, 999.001, E17.005, E17.037, 707/E17.038, 999.004, 999.102, E17.023, 707/E17.044, 652, 827, 999.003, 999.103,
(Continued)

(56) References Cited

U.S. PATENT DOCUMENTS 6,269,382 B1   7/2001  Cabrera et al.
6,330,572 B1  12/2001  Sitka
(Continued)

FOREIGN PATENT DOCUMENTS

JP   2006031668   2/2006
JP   2011515727   5/2011

OTHER PUBLICATIONS

International Search Report and Written Opinion from PCT/US2014/035531, dated Sep. 22, 2014, pp. 1-10.
(Continued)

*Primary Examiner* — Jay Morrison
*Assistant Examiner* — Ken Hoang
(74) *Attorney, Agent, or Firm* — Robert C. Kowert; Meyertons, Hood, Kivlin, Kowert & Goetzel, P.C.

(57) ABSTRACT

A method for grouping and storing objects across different storage solutions in storage systems according to analysis of multiple dimensions of information may be implemented as or in a storage management module. The module collects information about objects (e.g., data objects) in a storage system (e.g., a data storage system). The objects may be objects already stored in the storage system or may be new objects to be stored in the storage system. The module analyzes the collected information across multiple dimensions to determine groupings of the objects, and determines a storage solution for each determined grouping. The module may then direct storage of the objects in the groupings according to the determined storage solutions. Upon obtaining new information about object(s) in the storage system, the module may direct movement of the object(s) from one storage solution to another storage solution according to an analysis including the new information.

20 Claims, 8 Drawing Sheets

(58) Field of Classification Search
USPC ......... 707/999.2, E17.014, E17.02, E17.026, 707/E17.032, 640, 674, 756, 812, 821, 707/999.01, 999.1, 999.101, 999.104; 709/223, 213, 226, 203, 206, 219, 220, 709/232; 705/26.1, 26.8, 20, 26.5, 27.1, 705/27.2, 32, 34, 35, 57
See application file for complete search history.

(56) References Cited

U.S. PATENT DOCUMENTS

| | | |
|---|---|---|
| 7,007,048 B1 | 2/2006 | Murray et al. |
| 7,103,740 B1 | 9/2006 | Colgrove et al. |
| 7,225,211 B1 | 5/2007 | Colgrove et al. |
| 7,293,133 B1 | 11/2007 | Colgrove et al. |
| 7,734,661 B2 | 6/2010 | Jordan et al. |
| 7,949,637 B1* | 5/2011 | Burke ............... G06F 3/0605 707/655 |
| 8,055,622 B1 | 11/2011 | Botes et al. |
| 8,127,095 B1 | 2/2012 | Colgrove et al. |
| 8,370,597 B1* | 2/2013 | Chatterjee ......... G06F 3/0604 707/651 |
| 8,627,035 B2* | 1/2014 | Ambat et al. ............. 711/165 |
| 9,256,381 B1* | 2/2016 | Fultz ................... G06F 3/0611 |
| 2004/0199566 A1 | 10/2004 | Carlson et al. |
| 2005/0071349 A1 | 3/2005 | Jordan et al. |
| 2007/0271302 A1* | 11/2007 | Atkins et al. ............. 707/200 |
| 2010/0257140 A1* | 10/2010 | Davis et al. ............. 707/661 |
| 2010/0313203 A1 | 12/2010 | Dawson et al. |
| 2011/0161712 A1* | 6/2011 | Athalye ............... G06F 1/206 713/340 |
| 2012/0005424 A1* | 1/2012 | Shi et al. ............. 711/114 |
| 2012/0072656 A1* | 3/2012 | Archak et al. ............. 711/104 |
| 2012/0166749 A1* | 6/2012 | Eleftheriou et al. ......... 711/165 |
| 2012/0240073 A1* | 9/2012 | McCann ................ 715/775 |
| 2014/0188870 A1* | 7/2014 | Borthakur ......... G06F 17/30312 707/736 |

OTHER PUBLICATIONS

"Data Storage Scheme Supporting for Multidimensional Query", Keji Mao, et al., 2013, pp. 1-9.

Kohl, John, Carl Staelin, and Michael Stonebraker. "HighLight: using a log-structured file system for tertiary storage management." Proceedings of the 1993 Winter USENIX Meeting. 1992. pp. 1-15.

Muller, Keith, and Joseph Pasquale. "A high performance multi-structured file system design." ACM SIGOPS Operating Systems Review. vol. 25. No. 5. ACM, 1991. pp. 1-12.

U.S. Appl. No. 11/371,263, filed Mar. 8, 2006, John David Cormie et al.

Office Action from Canadian Application No. 2,910,211, dated Sep. 28, 2016, Amazon Technologies, Inc., pp. 1-3.

Extended European Search Report from PCT/US2014/035531, dated Oct. 13, 2016, Amazon Technologies, Inc., pp. 1-8.

Office Action from Japanese Application No. 2016-510813, dated Nov. 22, 2016 (English translation and Japanese version), pp. 1-10.

* cited by examiner

OBJECT STORAGE USING MULTIPLE DIMENSIONS OF OBJECT INFORMATION

BACKGROUND

In data storage technology, many types of storage technologies (which may also be referred to as storage solutions) exist, and provide a wide range of price, performance, capacity, and functionality. Generally, storage technologies that provide the fastest access, such as solid-state drive (SSD) technology devices and hard disk drive (HDD) technology devices, are more expensive (per unit of storage) than storage technologies that provide slower access, such as optical discs and magnetic tape drives. Thus, many data storage systems are designed and implemented with two or more tiers of storage technology, with more expensive but faster storage technology used in one or more higher tiers and less expensive but slower storage technology used in one or more lower tiers. Storage management methods (e.g., hierarchical storage management (HSM) methods) have been developed that direct the storing of data to different tiers in these data storage systems.

However, conventional storage management methods such as HSM typically consider only one dimension (access history) of information about data when making storage decisions, and typically only migrate data up or down a one-dimensional tier of data storage technologies according to the one dimension. For example, HSM methods generally store data that has been recently accessed (e.g., written or read) to the higher tier(s) (e.g., disk drives), and migrate data that has not been recently accessed (e.g., for a specified period) down to the lower tier(s) (e.g., tape). Data that has been migrated down (e.g., to tape) may be brought back up to a higher tier, generally only upon receiving an access request for the data. Data that is migrated up to a higher tier may remain on the tier for the specified period before being migrated back down to a lower tier (e.g., tape).

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Figure 7:
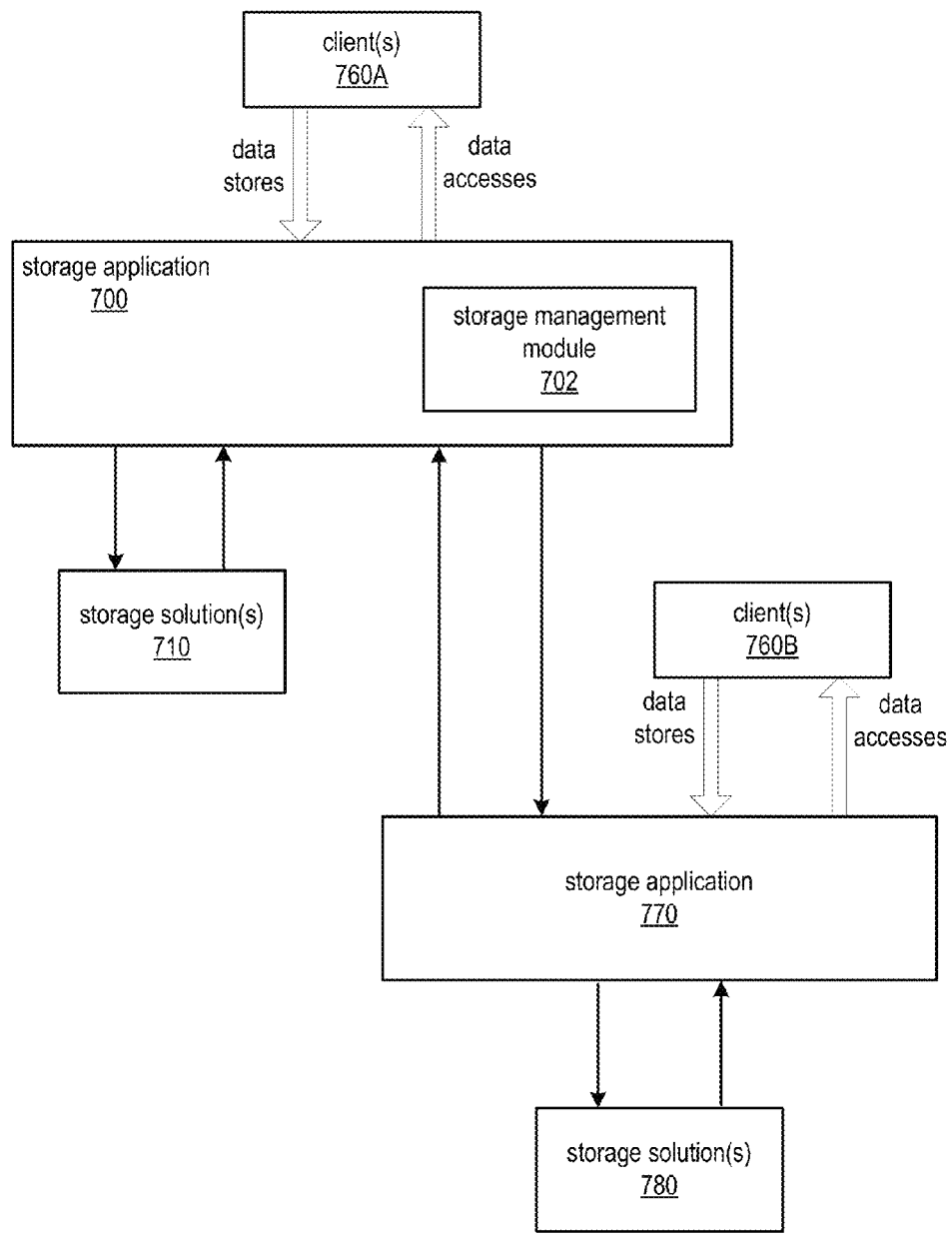
FIG. 7 is a block diagram that shows a logical view of an example storage system in which embodiments of a storage management method may be used to direct the distribution of data objects among multiple storage solutions including another storage application.
Figure 8:
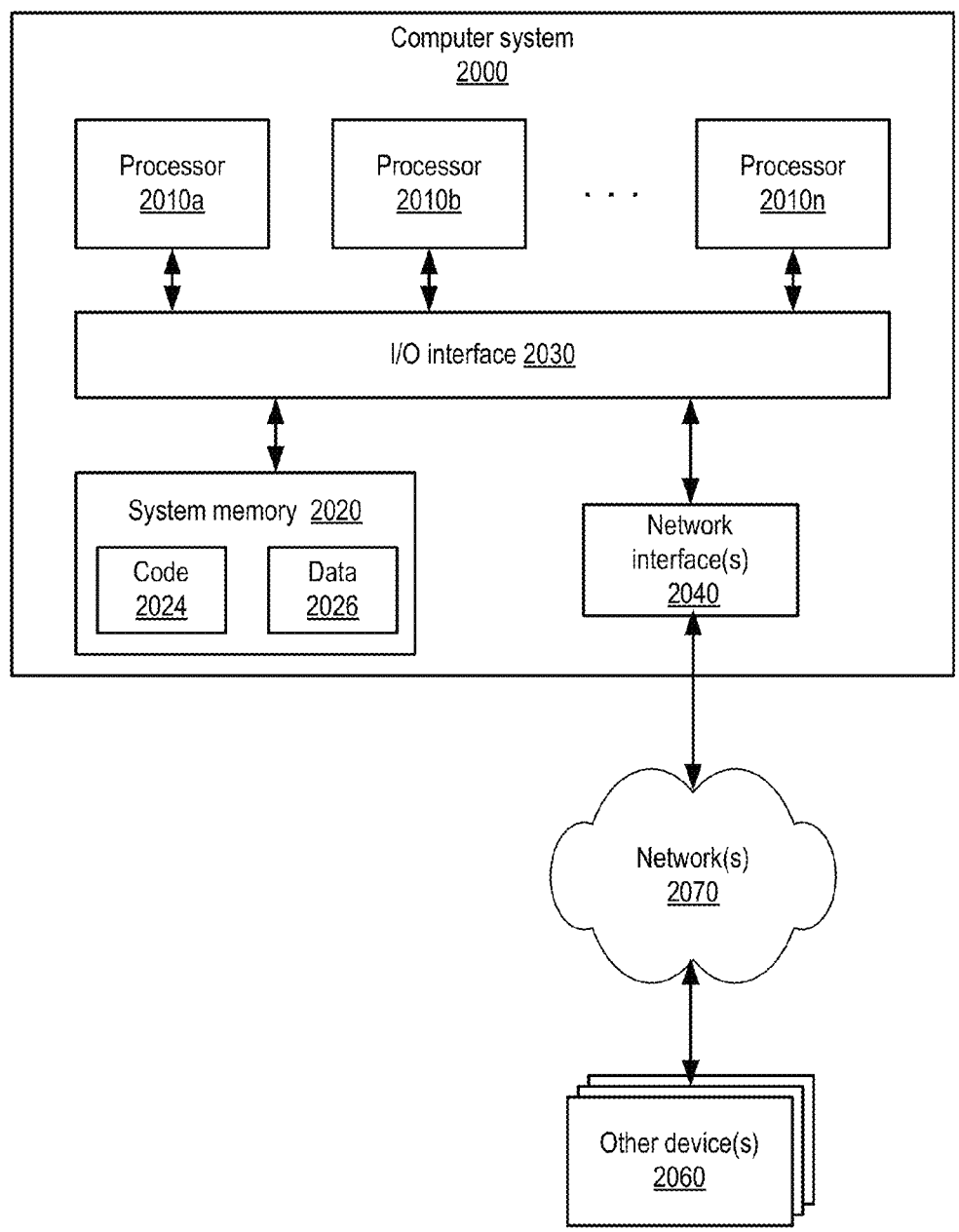
FIG. 8 is a block diagram illustrating an example computer system that may be used in some embodiments.

Various embodiments of methods and apparatus for grouping and storing objects across different storage solutions in storage systems according to analysis of multiple dimensions of information about the objects are described. A multi-dimensional storage management method is described that may be implemented as or in a storage management module on one or more computing devices. The storage management module may determine groupings of objects and direct the storing of the determined groups of objects across different storage solutions or tiers in a storage system according to analysis of multiple dimensions of information collected for the objects. An example computing device on which a storage management module may be implemented is shown in FIG. 8. Example storage systems in which a storage management module may be implemented are shown in FIGS. 3, 4, 6, and 7.

Figure 1:
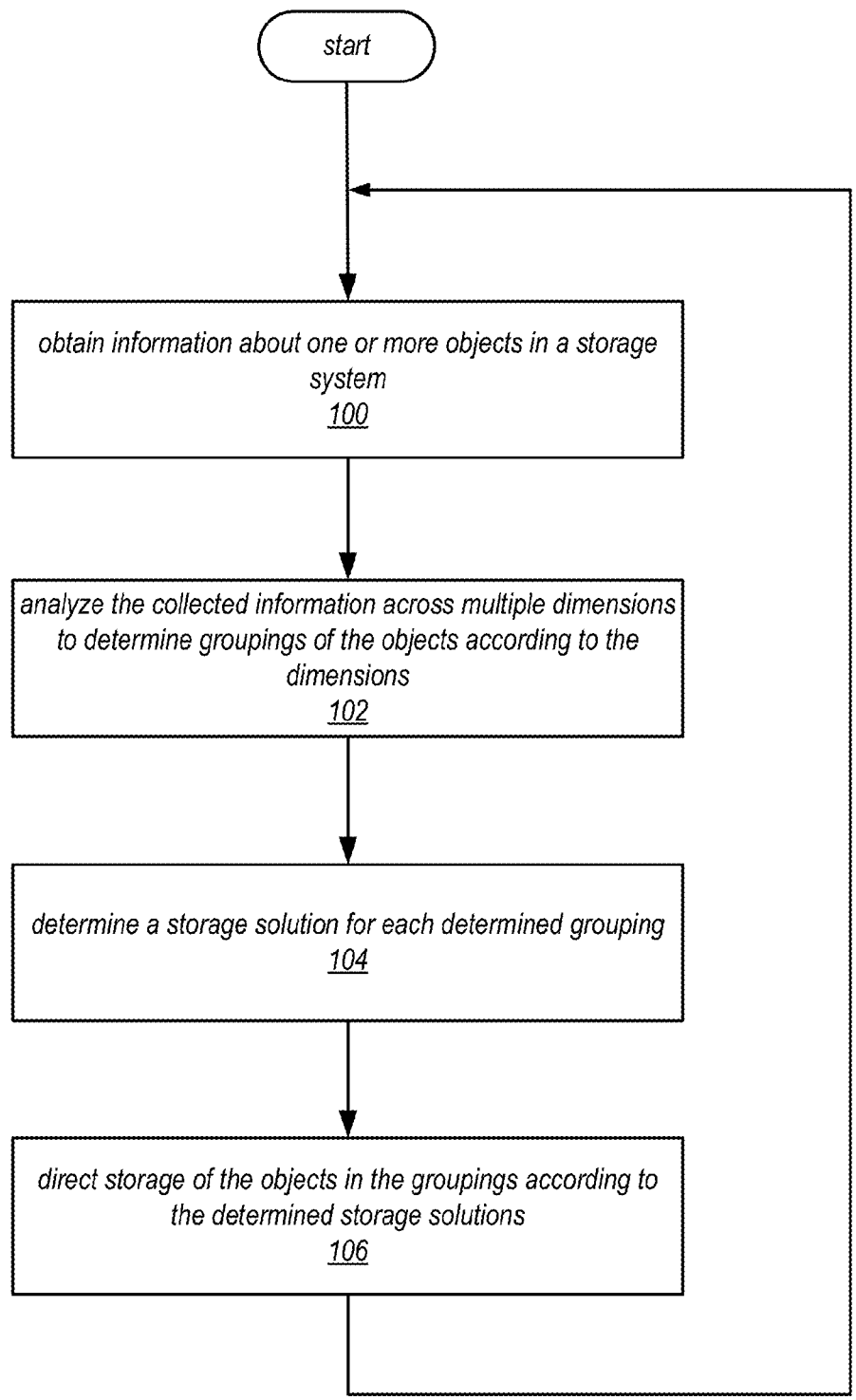
FIG. 1 is a high-level flowchart of a multi-dimensional storage management method that may be implemented as a storage management module in a storage system, according to at least some embodiments.

FIG. 1 is a high-level flowchart of a multi-dimensional storage management method that may be implemented as a storage management module in a storage system, according to at least some embodiments. As indicated at 100, the storage management method obtains information about one or more objects (e.g., data objects) in a storage system (e.g., a data storage system). For example, the storage management method may collect the information from metadata for objects stored in the storage system that is maintained by storage application software. The objects may be objects already stored in the storage system or new objects to be stored in the storage system. As indicated at 102, the storage management module analyzes the obtained information across multiple dimensions to determine groupings of the objects. As indicated at 104, the storage management module determines a storage solution for each determined grouping. As indicated at 106, the storage management module may direct storage of the objects in the groupings according to the determined storage solutions. Upon obtaining new information about an object or objects in the storage system, the storage management method may direct movement of the object(s) from one storage solution to another storage solution according to an analysis including the new information.

Embodiments of the multi-dimensional storage management method may, for example, be applied in storage systems where there is significant skew in object access or fetch rate, and significant differences in storage costs among the storage solutions. The storage management method may analyze information for objects stored to the storage system across multiple dimensions to determine group(s) of objects that are more likely to be accessed and that may be stored in more expensive (per unit of storage) storage solutions that provide relatively quick and inexpensive access to the objects. Other group(s) of objects may be determined that are less likely to be accessed and that can be stored in less expensive (per unit of storage) storage solutions but for which access to the objects generally takes longer and may be more expensive.

In at least some implementations, the various storage solutions may be implemented in a storage system as storage tiers, with a first or top tier implemented according to a most expensive (per unit of storage) storage solution that provides the fastest access to the objects stored therein to clients of the storage system, and a last or bottom tier implemented according to a least expensive (per unit of storage) storage solution from which objects take longer and are the most expensive to access. There may be, but are not necessarily, one or more intermediate tiers with intermediate levels of storage cost and access characteristics between the top and bottom tier. The multi-dimensional storage management method may be used to analyze information about data objects stored to the storage system to group the objects according to multiple dimensions and distribute the groupings of data objects to appropriate tiers.

As an example, a data storage system that implements the multi-dimensional storage management method may include two or more tiers of persistent storage solutions. A first or top tier may include solid-state drive (SSD) technology devices. A second or intermediate tier may include hard disk drive (HDD) technology devices. A bottom tier may, for example, involve storing data objects to magnetic tape or other removable persistent storage media and warehousing the storage media in a storage facility with minimal power and climate control. The storage management method may be implemented as or in a storage management module in the data storage system to direct the storing of data objects or groupings of data objects to particular ones of the tiers according to analysis of multiple dimensions of information collected for the data objects. The storage management method may be applied to information collected for data objects to direct the storing of new data objects to particular tiers, and/or to direct the moving or copying of data objects up the tiers (from a lower tier to a higher tier) or down the tiers (from a higher tier to a lower tier).

The above describes storage systems in which the storage management method is used to direct the storage of data objects across two or more storage tiers that are hierarchically arranged according to access characteristics and/or storage costs. However, the storage management method may also be applied in storage systems that include multiple different storage solutions that are not necessarily hierarchically arranged to direct the storage of determined grouping of objects to particular storage solutions that may be best suited to the groupings according to an analysis of multiple dimensions of information about the objects. For example, in some embodiments, the storage management method may collect information including multiple dimensions for the objects and perform a cluster analysis technique according to the multiple dimensions to determine clusters or groupings of objects. See FIG. 2B for an example. Characteristics of the groupings may then be examined and compared to characteristics of the various storage solutions to match the groupings to particular storage solutions. The groupings of objects may then be distributed to the determined storage solutions.

The multi-dimensional storage management method is primarily described herein in relation to data storage systems in which the objects being stored are data objects and the storage solutions may include various data storage technologies and media, such as persistent memory technology, solid-state drive (SSD) technology, hard disk drive (HDD) technology, persistent storage media such as magnetic tape or disk and optical disk (OD), etc, as well as various storage methods or locations such as climate controlled, powered "raised floor" data centers and low-power, minimally climate controlled storage facilities or warehouses. However, the multi-dimensional storage management method may be applied to any storage system. For example, embodiments may be applied to parts or merchandise storage or distribution systems in which the objects being stored are physical objects, and the storage solutions include different physical locations within a storage or distribution facility and/or across multiple, geographically dispersed storage or distribution facilities. As another example, embodiments of the storage management method may be applied in multi-level cached memory systems, where data may be distributed across different levels of memory according to a multi-dimensional analysis of the data, as well as to memory objects in a garbage collection system.

Figure 2A:
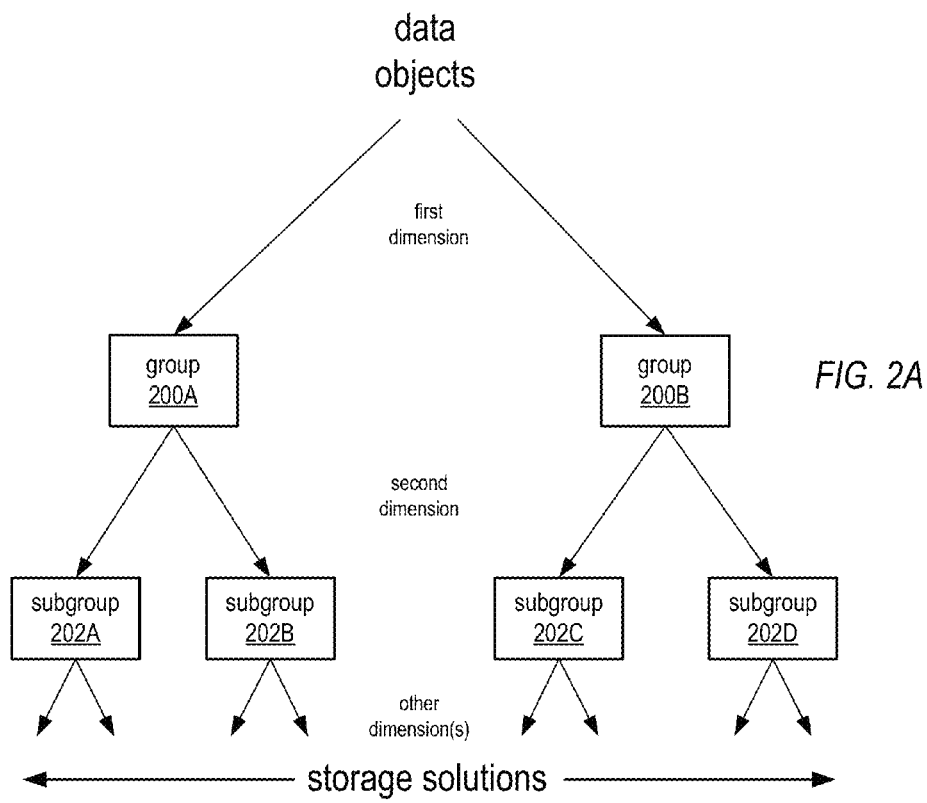
FIG. 2A graphically illustrates determining groupings of data objects across multiple dimensions, according to at least some embodiments.

FIG. 2A graphically illustrates determining groupings of data objects across multiple dimensions, according to at least some embodiments. In at least some embodiments, an analysis of a first dimension of information about the data objects may be performed to determine two or more groups 200 of the data objects. A second dimension may also be analyzed to further divide at least one of groups 200 into two or more subgroups 202. In at least some embodiments, one or more other dimensions may also be analyzed to further divide at least one of subgroups 202. The different groupings may be stored to particular ones of two or more different storage solutions in the data storage system that are determined for the groupings.

Figure 2B:
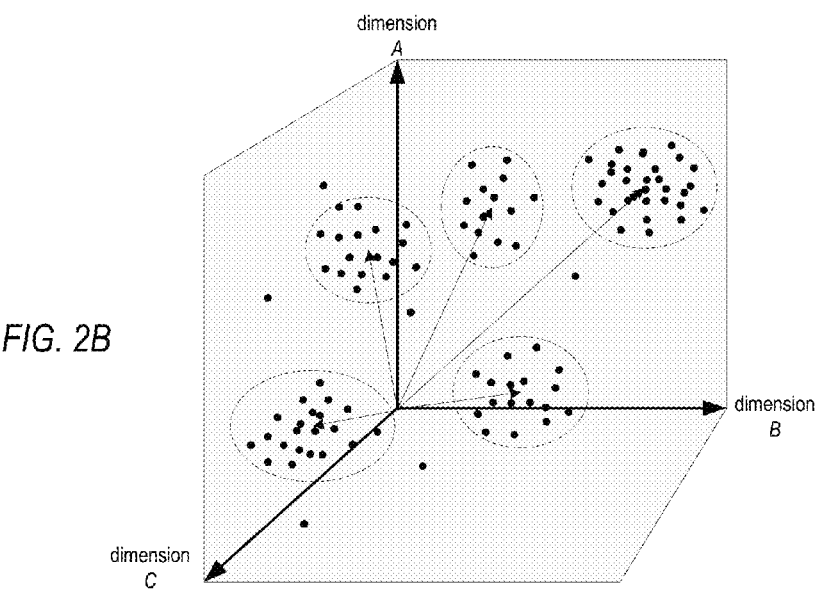
FIG. 2B graphically illustrates determining groupings of data objects across multiple dimensions using a cluster analysis technique, according to at least some embodiments.

FIG. 2B graphically illustrates determining groupings of data objects across multiple dimensions using a cluster analysis technique, according to at least some embodiments. In some embodiments, the storage management method may collect information including multiple dimensions for the objects and perform a cluster analysis technique according to the multiple dimensions to determine clusters or groupings of objects. As shown in the example of FIG. 2B, three dimensions A, B, and C are used in a cluster analysis to determine five clusters or groupings of data objects. Characteristics of the groupings may then be examined and compared to characteristics of various storage solutions to match the groupings to particular storage solutions. The groupings of data objects may then be distributed to the determined storage solutions.

In at least some embodiments, the multiple dimensions of information about objects (e.g., data objects) that may be analyzed by the storage management method may include at least age of the objects and access frequency of the objects. In general, newer data objects are more likely to be accessed but have a shorter expected future life than older data objects, and data objects that were rarely accessed in the past are highly probable to be rarely accessed in the future. These observations may be leveraged by at least some embodiments of the storage management method described herein to group and store data objects according to multiple dimensions.

In data storage systems, there is a cost to fetching storage media (e.g., magnetic tape or disk, optical disk, etc.) when access of data objects stored on the media is required. Thus, data objects that are more likely to be accessed may be grouped and stored on a first storage media, while data objects that are less likely to be accessed may be grouped and stored on a second storage media. One method of determining likelihood of access is age; as noted above, newer objects tend to be accessed more frequently than older objects. Thus, age may be a dimension that is considered, and newer objects may be stored to the first storage media, while older objects may be stored to the second storage media. The first storage media may be referred to as new object media, and the second storage media may be referred to as old object media. An impact of sorting into these two groups is that the reference rate on the new object media is raised, while the reference rate on the old object media is reduced. Since old object media dominates in many storage systems such as archival storage systems, this approach may significantly reduce the number of media fetch requests since the old object media is relatively rarely fetched, and the new object media is generally already available and does not require fetching. Note that the cost of the new object media per unit of data stored may generally be higher than the cost of the old object media per unit of data stored, as a less expensive storage solution (e.g., commodity hard disk drive (HDD) technology, magnetic tape, optical disk, etc.) may be used for the old object media, while a more expensive storage solution (e.g., solid-state drive (SSD) technology) may be used for the new object media.

In at least some embodiments of the storage management method, another dimension, access pattern or access frequency, may be added to the above, and the technique of grouping the data objects into different storage media may be applied again. Using this dimension, the data objects may be further subdivided within the old object media and new object media groups based on access patterns into two subgroups in each group: 1) recently accessed data objects (which may also be referred to as hot objects) and 2) not recently accessed data objects (which may also be referred to as cold objects). Thus, the data objects may be subdivided into four groups: hot new objects, cold new objects, hot old objects, and cold old objects. Each of these groups may be stored to a different storage media or storage solution.

A useful definition of "not recently read", particularly in some data storage applications such as archival storage, is "never read". In at least some embodiments, using this definition and the two dimensions of interest described above (old objects and new objects), the data objects may be subdivided into four classes: 1) new objects that have been accessed, 2) new objects that have never been accessed, 3) old objects that have been accessed, and 4) old objects that have never been accessed. Each of these classes may be stored to a different storage media, yielding four levels or tiers of data storage solutions. In at least some embodiments, group 4 (old data objects that have never been accessed) can be stored remotely and very inexpensively in a location (e.g., a warehouse) from which fetching and accessing the data objects takes more time and is relatively expensive, but for which storage costs per unit of data stored are very low due to low power consumption, limited climate control, and other factors. Group 3 (old data objects that have been accessed) may need to be more accessible than group 4, but not as accessible as groups 1 and 2 and thus may be stored less expensively than groups 1 and 2. Similarly, group 2 may need to be more accessible than group 3, but not as accessible as group 1 and thus may be stored less expensively than group 1.

The above describes two dimensions (age and access frequency) that may be analyzed by a storage management method to group data objects according to the dimensions into two, three or more groups which each may be stored to a different storage solution. A storage solution for each group may be selected according to the access requirements (time and cost) and storage cost of each group. However, the storage management method may be extended and applied according to more than these two dimensions to group the data objects into multiple groups according to multiple dimensions, with at least some of the groups stored to different storage solutions.

The following describes several other dimensions that may be used instead of or in addition to age and access frequency in at least some embodiments of the storage management method to group or classify data objects. Note that these other dimensions are given by way of example, and are not intended to be limiting.

In at least some embodiments, object type may be another dimension that is considered. Data objects of different types (e.g., files of different types) may exhibit different usage models and thus different access patterns. For example, backup data (e.g., database backup files) and audit data (e.g., corporate emails being stored for archival purposes) may be rarely or never accessed, and thus may be stored to one or more storage solutions or tiers that provide less expensive cost per unit to store but that are more expensive to access. As another example, some types of data objects (e.g., database records, online transaction processing data, etc.) may need to be maintained at a more or at the most accessible tier of storage. As another example, in some embodiments in which the data storage system uses a redundancy model or models (e.g., erasure encoding) for data, redundant data may be infrequently accessed, and thus may be stored to one or more storage solutions or tiers that provide less expensive cost per unit to store but that are more expensive to access.

In at least some embodiments, access information for data objects in the storage system may be tracked and/or mined by the storage management method and analyzed based on one or more access metrics (access data/time, user identity, etc.) to determine one or more groupings of data objects based on various access patterns or combinations thereof. Some examples are given below.

In at least some embodiments, access information may be tracked over time for the data objects, and the tracked access information may be used to provide one or more additional dimensions on which storage decisions can be based. For example, instead of or in addition to using the date/time information for when data objects were last accessed (or never accessed) as a dimension on which storage decisions are made, date/time information for multiple accesses of data objects into the past (e.g., back to the creation date/time of the data objects) may be tracked and analyzed to determine one or more dimensions such as general access patterns, access frequency over time, and/or access patterns at certain times (e.g., every Friday, once a year at or around a particular date, at the end of each month, etc.)

In addition to tracking date/time access information over time, at least some embodiments may also track and analyze other access-related information, for example which user(s) or application(s) access the data objects, to provide one or more additional dimensions on which storage decisions can be based. As an example of using user-related access information, analysis of access information that is tracked over time may determine that a particular user or application that periodically or aperiodically accesses a data object also accesses one or more other data objects at or around the same time. Thus, it is probable that, if this user or application accesses one of the data objects, the other data object(s) will also be accessed. The data objects can thus be grouped, and storage decisions may be made according to the group (e.g., storing the group of data objects together on the same storage solution, or moving all of the data objects in the group up to a more accessible storage solution when any one of the data objects in the group is accessed).

In at least some embodiments, object relationships or correlations, for example temporal relationships, may provide one or more other dimensions that may be considered and used to determine groupings of data objects. For example, analysis of the tracked access information for data objects in the storage system may determine that a group of data objects that are rarely accessed (which may be, but are not necessarily, of the same type) tend to be accessed together when accessed, and thus storage decisions may be made for and applied to the temporally related objects as a group.

In at least some embodiments, user access patterns may be another dimension that may be considered by the storage management method when making storage decisions. For example, access patterns may be tracked over time as described above, and may be used to determine groups of data objects that tend to get accessed at some interval, for example once a month, once a quarter, or once a year, or groups of objects that tend to be accessed together by a particular user.

In at least some embodiments, object metadata (e.g., ownership, access permissions (e.g., read/write permissions assigned to particular users), timestamps (creation, last written, last read, etc.), and any other metadata related to a data object that may be maintained in a storage system) may provide one or more other dimensions that may be considered by the storage management method when making storage decisions.

In at least some embodiments, client-specified priorities, which may for example be expressed in service level agreements (SLAs) with a service provider, may provide one or more dimensions that may be considered by the storage management method when making storage decisions. For example, a service provider may provide or negotiate different levels of SLAs to different clients, or to different sets of data objects for a single client. The information in the SLAs for the clients may be used in determining storage solutions or tiers for the clients' data. As a non-limiting example, an SLA with one client may state that the client's data objects will be accessible within a certain period (e.g., within two hours, or four hours) of receiving a request for the data objects, while an SLA with another client may state some other period (e.g., six hours, or twelve hours). This information may be used to match and distribute the various clients' data objects to different storage solutions or tiers in the storage system to provide an appropriate access time for the clients' data objects. As another example, an SLA with a client may state that one group of the client's data objects (e.g., online transaction records) will always be as immediately accessible as possible (e.g., on the top tier of the storage system), while other group(s) of the client's data objects (e.g., backups, redundancy data, etc.) will be accessible within some longer period (e.g., two hours, or four hours, or longer). This information may be used to match and distribute the client's groups of data objects to different storage solutions or tiers in the storage system to provide appropriate access times for the client's various groups of data objects.

In at least some embodiments, a storage management module may perform the collection of information about data objects, categorizing of the data objects into groups according to multiple dimensions, and determining particular storage solutions for the groups. However, in some embodiments, user input, for example input from a client that owns a particular set of data objects, may be used to specify a storage solution or tier for at least some data objects.

Figure 3:
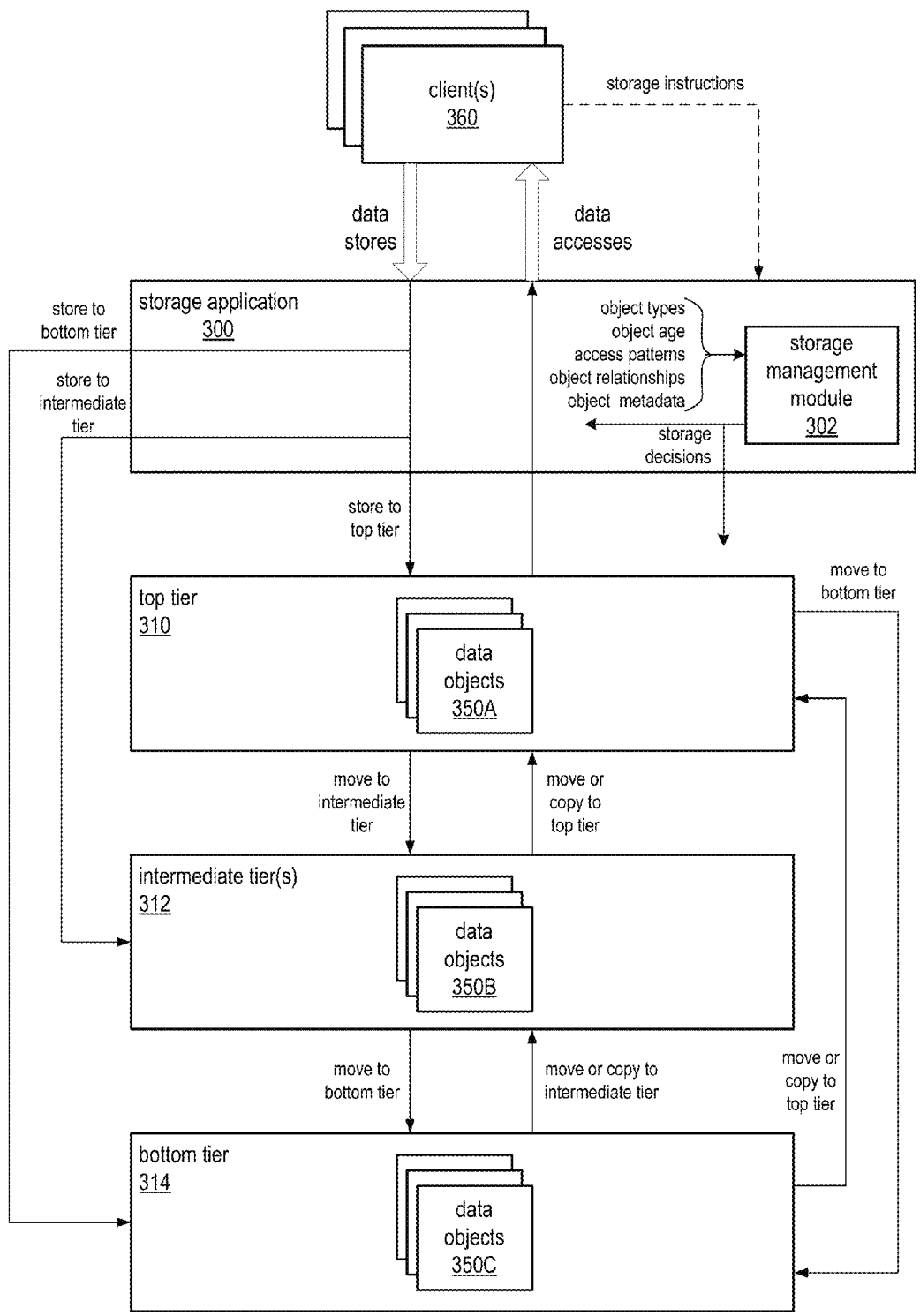
FIG. 3 is a block diagram that shows a logical view of an example storage system in which embodiments of a storage management method may be implemented.

FIG. 3 is a block diagram that shows a logical view of an example storage system in which embodiments of a storage management method may be implemented. The storage system may, for example, be a storage service implemented on a service provider's network that provides virtualized storage to clients via an intermediate network such as the Internet. The storage system may include a storage application 300 that may implement an embodiment of the storage management method as or in a storage management module 302. The storage application 300 may also maintain a store of metadata for data objects stored in the storage system. The storage application 300 may be implemented on one or more computing devices. An example computing device on which storage application 300 may be implemented is shown in FIG. 8.

The storage system may include two or more tiers or levels of storage. In this example, the storage system includes a top tier 310 storing data objects 350A, a bottom tier 314 storing data objects 350C, and one or more intermediate tiers 312 storing data objects 350B. The top tier 310 may, for example, include solid-state drive (SSD) technology devices. At least one intermediate tier 312 may, for example, include hard disk drive (HDD) technology devices. The bottom tier 314 may, for example, involve storing data objects 350C to magnetic tape, optical disk, or other removable persistent storage media. In at least some embodiments, the media used as bottom tier 314 storage (e.g., tape media) may be warehoused in a facility with low power requirements and a low or minimal level of climate control. Note, however, that there may be two, three, or more tiers, different ones of the tiers may include storage technology of different types than those given in this example, and a given tier may include storage technology of one, two, or more types.

The storage application 300 may receive new data objects to be stored in the storage system from one or more clients 360. The storage application 300 may also receive requests to access stored data objects 350 from the client(s) 360. In addition, the storage application 300 may internally generate some data objects, for example backup, replica, or redundancy data objects for client data stored in the storage system.

The storage management module 302 may collect information for data objects including but not limited to object age, access frequency, access patterns, object types, object relationships, and object metadata, and, based on multiple dimensions determined from the collected information, make storage decisions for the data objects in or entering the storage system. In at least some embodiments, information may be collected for new data objects being stored to the storage system by the clients 360 and for data objects 350 that already reside in the storage system. A storage decision by the storage management module 302 may direct the storage application 300 and/or one of the storage tiers to store, move, or copy one or more data objects to a specified storage tier.

In some embodiments, new data objects stored to the storage system by client(s) 360 may be at least initially stored to top tier 310. Alternatively, in some embodiments, the storage management module 302 may collect at least some information about the new data objects and make a storage decision for the new data objects based on one or more other dimensions of the information (note that the object age, one dimension that may be considered, is "new"). For example, in some embodiments, the storage management module 302 may examine the type of data objects that a client 360 is storing to the storage system and decide which storage tier the data objects should be stored to based at least in part on the object type. For example, if the data objects are determined to be backup data from the client 360, the storage management module 302 may determine that the data objects are unlikely to be accessed and thus direct the data object(s) to be stored to the bottom tier 314 or, alternatively, to an intermediate tier 312, rather than to the top tier 310. As another example, if the data objects re determined to be audit data (e.g., email messages being archived) from the client 360, the storage management module 302 may determine that the data objects are unlikely to be accessed and thus direct the data object(s) to be stored to the bottom tier 314 or, alternatively, to an intermediate tier 312, rather than to the top tier 310. In at least some embodiments, if the information collected for new data objects is insufficient to make a storage decision (e.g., if the object type is unknown), the new data objects may by default be initially stored to the top tier 310.

In some embodiments, a client 360 may provide storage instructions for particular new data objects or groups of new data objects being stored to the storage system, or alternatively for data objects previously stored to the storage system. The storage instructions may, for example, direct the storage application 300 to store the data object(s) to a particular storage solution or storage tier. Storage instructions from a client 360 may thus override decisions from the storage management module 302, or alternatively may be input to the storage management module 302 as additional information that may be considered when making storage decisions for the respective data object(s).

In at least some embodiments, the storage management module 302 may periodically or aperiodically collect information for data objects 350 that are stored in one or more of the storage tiers and, based on one or more dimensions of the information, make storage decisions for the data objects 350. The storage management module 302 may also make storage decisions for particular data objects 350 in response to access requests received from clients 360. The following gives several examples of storage decisions that may be made for data objects 350 stored in the storage system. Note that these examples are not intended to be exhaustive or limiting.

In at least some embodiments, the storage management module 302 may collect information for data objects 350A in top tier 310 and, based on multiple dimensions of the information, for example the age and access frequency of the data objects 350A, decide whether to move the data objects 350A to an intermediate tier 312 or to the bottom tier 314. For example, in at least some embodiments, if a data object 350A is older than an age threshold and has never been accessed, the storage management module 302 may decide to move the data object 350A to the bottom tier 314. If a data object is newer than the age threshold but has never been accessed, the storage management module 302 may decide to move the data object 350A to a first intermediate tier 312. If a data object is older than the age threshold but has been accessed, the storage management module 302 may decide to move the data object 350A to a second intermediate tier 312. Data objects 350A that are still new and that have been accessed may be left on top tier 310.

In at least some embodiments, other dimensions of information than object age and access frequency may be considered by the storage management module 302 in making these decisions. For example, in some embodiments, relationships among a set of data objects 350A may be considered. As an example, the storage management module 302 may determine that a set of data objects 350A that are rarely accessed may tend to get accessed together, and thus if one or more of the data objects 350A in the set have been recently accessed, then the storage management module 302 may decide to leave all of the data objects 350A in the set on the top tier 310. As another example, the storage management module 302 may consider the object type in making decisions. For example, data objects 350A that are known to be of certain types that are unlikely to be accessed (e.g., backup or audit data) that are found on the top tier 310 may be moved down to a lower tier regardless of age or access frequency, and data objects 350A that are known to be of other types that are more likely to be accessed (e.g., database objects) may be left on the top tier 310 regardless of age or access frequency.

In at least some embodiments, the storage management module 302 may obtain or collect information for data objects 350B in an intermediate tier 312 and, based on multiple dimensions of the information, decide whether to move the data objects 350B to the top tier 310, to another intermediate tier 312, or to the bottom tier 314. In at least some embodiments, at least the age and access frequency of the data objects 350B may be considered. For example, if a data object 350B is determined to be older than an age threshold (which may be, but is not necessarily, different than the age threshold used for the top tier 310) and has never been accessed, then the storage management module 302 may decide to move the data object 350B down to a lower intermediate tier 312 or to the bottom tier 314. As another example, if the storage management module 302 determines that a data object 350B has been recently accessed, then the storage management module 302 may decide to move the data object 350B up to a higher intermediate tier 312 or to the top tier 310. Note that receiving an access request for a data object 350B on an intermediate tier 312 may cause the data object 350B to be moved to a higher tier (e.g., to a higher intermediate tier 312 or to the top tier 310).

In at least some embodiments, other dimensions of information than object age and access frequency, for example object type and object relationships, may be considered by the storage management module 302 in making these decisions for data objects 350B on the intermediate tier(s), for example as described above in reference to data objects 350A on the top tier 310. As an example, the storage management module 302 may determine that a set of data objects 350B that are rarely accessed may tend to get accessed together, and thus if one or more of the data objects 350B in the set have been recently accessed, then the storage management module 302 may decide to move all of the data objects 350B in the set to the top tier 310.

In at least some embodiments, the storage management module 302 may track and/or mine access information for the data objects 350 in the storage system and analyze the access information based on one or more access metrics (access data/time, user identity, etc.) to determine one or more groupings of data objects based on various access patterns or combinations thereof. In at least some embodiments, access information may be tracked over time for the data objects, and the tracked access information may be used to provide one or more additional dimensions on which storage decisions can be based. For example, date/time information for multiple accesses of data objects into the past (e.g., back to the creation date/time of the data objects) may be tracked and analyzed to determine one or more dimensions such as general access patterns, access frequency over time, and/or access patterns at certain times (e.g., every Friday, once a year at or around a particular date, at the end of each month, etc.)

Another dimension that may be considered in at least some embodiments is user access patterns. For example, the storage management module 302 may determine that a set of one or more data objects 350 (which may or may not be of the same type) tend to get accessed at some interval, for example once a month, once a quarter, or once a year. The storage management module 302 may move the set of data objects 350 up from a lower tier (e.g., an intermediate tier 312 or the bottom tier 314) to a higher tier (e.g., to top tier 310) according to the interval, and move the set of data objects 350 down to a lower tier (e.g., to an intermediate tier 312 or the bottom tier 314) once the data objects 350 are no longer being accessed.

In at least some embodiments, client-specified priorities, for example expressed in service level agreements (SLAs) with a service provider, may provide one or more dimensions that may be considered by the storage management module 302 when making storage decisions. For example, a service provider may provide different levels of SLAs to different clients, or to different sets of data objects for a single client. The information in the SLAs for the clients may be used in determining storage solutions or tiers for the clients' data.

In at least some embodiments, data objects 350C on the bottom tier 314 may tend to stay on the bottom tier 314 unless an access request for the data objects 350C is received from a client 360. However, one or more dimensions of data objects 350C on the bottom tier may be considered by the storage management module 302 and result in a decision to move or copy one or more of the data objects 350C on lower tier 314 up to a higher tier (e.g., to an intermediate tier 312 or to the top tier 310). For example, as mentioned above, user access patterns may result in a set of data objects 350C being moved or copied up to a higher tier. As another example, all of the data objects 350C in a temporally related set of data objects 350C that tend to be accessed together may be moved or copied from the bottom tier 314 to a higher tier if at least one data object 350C in the set is accessed.

As previously noted, in some implementations the bottom tier 314 of the storage system may involve storing data objects 350C to magnetic tape or other removable persistent media. The media used as bottom tier 314 storage (e.g., tape media) may be moved to and warehoused in a separate facility which may have low power requirements and a low or minimal amount of climate control. In at least some embodiments, the bottom tier 314 may be considered a cold archival storage for data objects 350. The cost of moving data objects 350 to and retrieving data objects 350 from the bottom tier 314 may thus be very high, while the cost per unit to store the data objects 350 may be very low.

In some embodiments, instead of removing data objects 350C from the bottom tier 314 and moving the data objects 350C to a higher tier (e.g., the top tier 310) when the data objects 350 need to be accessed, and then later moving the data objects 350 back to the bottom tier 314 when the data objects 350 are no longer being accessed, a copy of the data objects 350C may be created and moved to the higher tier, while the original of the data objects 350C may be left stored on the media in the bottom tier 314. When the copy of the data objects 350 on the higher tier is no longer being accessed, the copy of the data objects 350 can simply be deleted from (or flagged for garbage collection in) the higher tier. In some implementations, a similar method may be used to copy data objects 350B from an intermediate tier 312 to a higher tier (e.g., the top tier 312).

Figure 4:
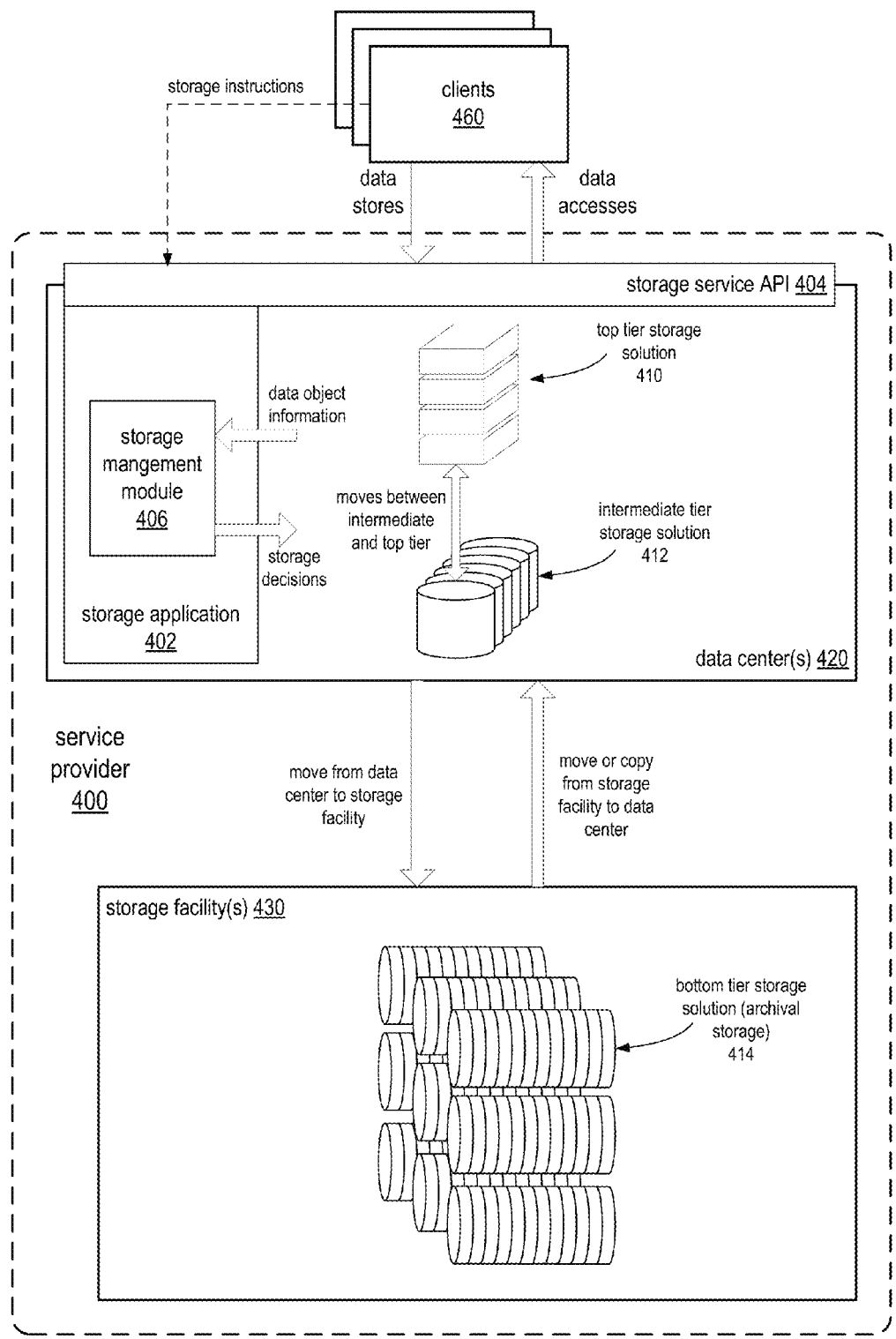
FIG. 4 illustrates an example physical implementation of a storage system in which embodiments of a storage management method may be implemented.

FIG. 4 illustrates an example physical implementation of a storage system in which embodiments of a storage management method may be implemented. For example, the logical view of the example storage system shown in FIG. 3 may be implemented according to the example shown in FIG. 4.

FIG. 4 also illustrates the storage system as a storage service implemented by a service provider 400. The storage service may be implemented on a provider network and may provide remote storage to multiple clients 460 of the service provider 400 via an intermediate network such as the Internet. In some implementations, at least some clients 460 may be processes within service provider 400 that may access the storage service via a network infrastructure of the service provider 400. Clients 460 may access the storage service via a storage service API 404 to write data to and read data from the storage provided by the storage service. The data stored by clients 460 may in at least some cases be stored on multi-tenant storage hardware; that is, the data of two or more clients 460 may be stored to the same storage device(s) within the storage system, and the data of any one client 460 may be spread across two or more storage device(s) within the storage system. Storage service software and/or hardware components (shown as storage application 402) may manage storing client data to and retrieving client data from the physical storage device(s) within the storage system. The storage service, via the API 404, may present the storage to each client 460 as virtualized storage; that is, each client 460 may view their own data in the storage system, for example as virtualized disks or volumes, and may access (read from or write to) their own data, while other clients' data is not viewable by or accessible to the client 460.

The service provider 400 may implement a service provider network within or across one or more data centers 420. Each data center 420 may include hundreds or thousands of networked storage devices (e.g., rack-mounted storage devices) on which the storage service implements and maintains the data storage provided by the service, as well as other hardware such as servers, networking devices (routers, switches, load balancers, etc.), and cabling (e.g., data cables such as fiber optic cables, as well as power cables). In addition to the costs of the hardware, data center 420 may typically be a physical facility in which power requirements and costs are high, as power is provided to networking, server, storage, and other hardware devices within the data center 420, and the facility is typically climate-controlled to protect the hardware and compensate for the thermal load of the electrical equipment.

In at least some implementations, the physical data storage devices used by the storage service in the data center(s) may include two or more different types of storage devices with different costs and characteristics including but not limited to access characteristics. For example, some storage devices may be relatively expensive storage devices with relatively fast access times (and possibly relatively high power requirements) such as flash memory technology or solid-state drive (SSD) technology devices, while other storage devices may be less expensive devices with slower access times (and possibly relatively low power requirements) such as commodity hard disk drive (HDD) technology devices.

In at least some embodiments, the service provider may thus implement two or more tiers of storage devices with different costs and characteristics within the data center(s) 420, and the storage service may leverage the storage management method described herein (e.g., implemented as a storage management module 406 within storage application 402) to distribute the clients' data objects across the tiers. For example, as shown in FIG. 3, the storage service may use solid-state drive (SSD) technology devices as a top tier storage solution 410, and commodity hard disk drive (HDD) technology devices as an intermediate tier storage solution 412. Note that other technology devices may be used to implement one or more additional intermediate tiers 412 in data center(s) 420.

The service provider 400 may also implement one or more storage facilities 430 that may be used for bottom tier or archival storage in the storage system. Note that a storage facility 430 may be adjacent or near to or even within a data center 420 facility, or may be geographically distant from any data center 420. A storage facility 430 may essentially be a warehouse for storing persistent but offline storage media such as magnetic tape or optical disks, and may thus have low power requirements and a low or minimal amount of climate control. In at least some embodiments, the one or more storage facilities 430 may be considered a cold archival storage for data objects stored to removable, persistent storage media such as tape or optical disks. The cost of moving data to and retrieving data from the storage facilities 430 may thus be very high, while the cost per unit to store data in the storage facilities 430 may be very low.

The storage service may leverage the storage management method described herein to detect data objects that can be archived and direct the moving of the detected data objects from the top and/or intermediate tiers in the data centers 420 to the one or more storage facilities 430. For example, the storage management method may be used to collect and analyze information about data objects stored in the top 410 and/or intermediate 412 tiers in the data center(s) 420 and determine, according to one or more dimensions of the information, such as age, access frequency, type, and inter-object relationships, one or more groups of data objects that can be archived and that thus can be moved to archival storage in the storage facilities 430. The one or more groups of data objects may then be moved or copied from the storage devices in the tier(s) to removable, persistent storage media, such as tape or optical disks, and the storage media may then be transported to and stored in the one or more storage facilities 430. Alternatively, the one or more groups of data objects may be electronically transmitted to a storage facility 430 (e.g., via a high-speed network connection) and written to the storage media at the storage facility 430.

The storage service may also leverage the storage management method described herein to detect data objects to be retrieved from the one or more storage facilities 430 and direct the moving or copying of the detected data objects from the one or more storage facilities 430 to the top tier 410 or to an intermediate tier 412 in a data center 420. For example, the storage management method may be used to collect and analyze information about data objects stored in the storage facilities 430 and determine, according to one or more dimensions of the information, such as inter-object relationships and user access patterns, one or more groups of data objects that can be retrieved from archival storage in the storage facilities 430 and moved or copied to the top tier 410 or to an intermediate tier 412 in a data center 420 for easier access. Storage media containing the one or more groups of data objects may then be retrieved from the storage facilities 430 and used to move or copy the group(s) of data objects to one or more of the storage tiers in the data center(s) 420. In some embodiments, copies of the group(s) of data objects may be made to storage media and the storage media containing the copies may be transported to the data center(s) 420, where the storage media may be used to create copies of the groups of data objects on one or more of the storage tiers in the data center(s). Alternatively, the one or more groups of data objects may be electronically transmitted from the storage facility 430 (e.g., via a high-speed network connection) to the data center(s) 420.

In some embodiments, instead of moving a group of data objects from the storage media in a storage facility 430 to a storage tier (e.g., the top tier 410) in a data center 420, and then later moving the data objects back to the storage facility 430 when the data objects are no longer being accessed, a copy of the data objects may be created and moved to the data center 420, while the original storage media containing the data objects may remain in the storage facility 430. When the copy of the data objects in the data center 420 is no longer being accessed, the copy can simply be deleted from (or flagged for garbage collection in) the storage devices in the data center 420.

FIGS. 3 and 4 illustrate data storage systems in which the storage management method is used to direct the storage of data objects across two or more storage tiers that may be hierarchically arranged according to access characteristics and/or storage costs. However, the storage management method may also be applied in data storage systems that include multiple different storage solutions with different characteristics to direct the storage of determined grouping of data objects to particular storage solutions that may be best suited to the groupings according to an analysis of multiple dimensions of information about the data objects, for example according to a cluster analysis technique. See FIG. 2B for an example of a cluster analysis on multiple dimensions to determine clusters or groupings of data objects. Characteristics of the groupings may then be examined and compared to the characteristics of the various storage solutions in the storage system to match the groupings to particular storage solutions. The groupings of data objects may then be stored or moved to the determined storage solutions.

Figure 5:
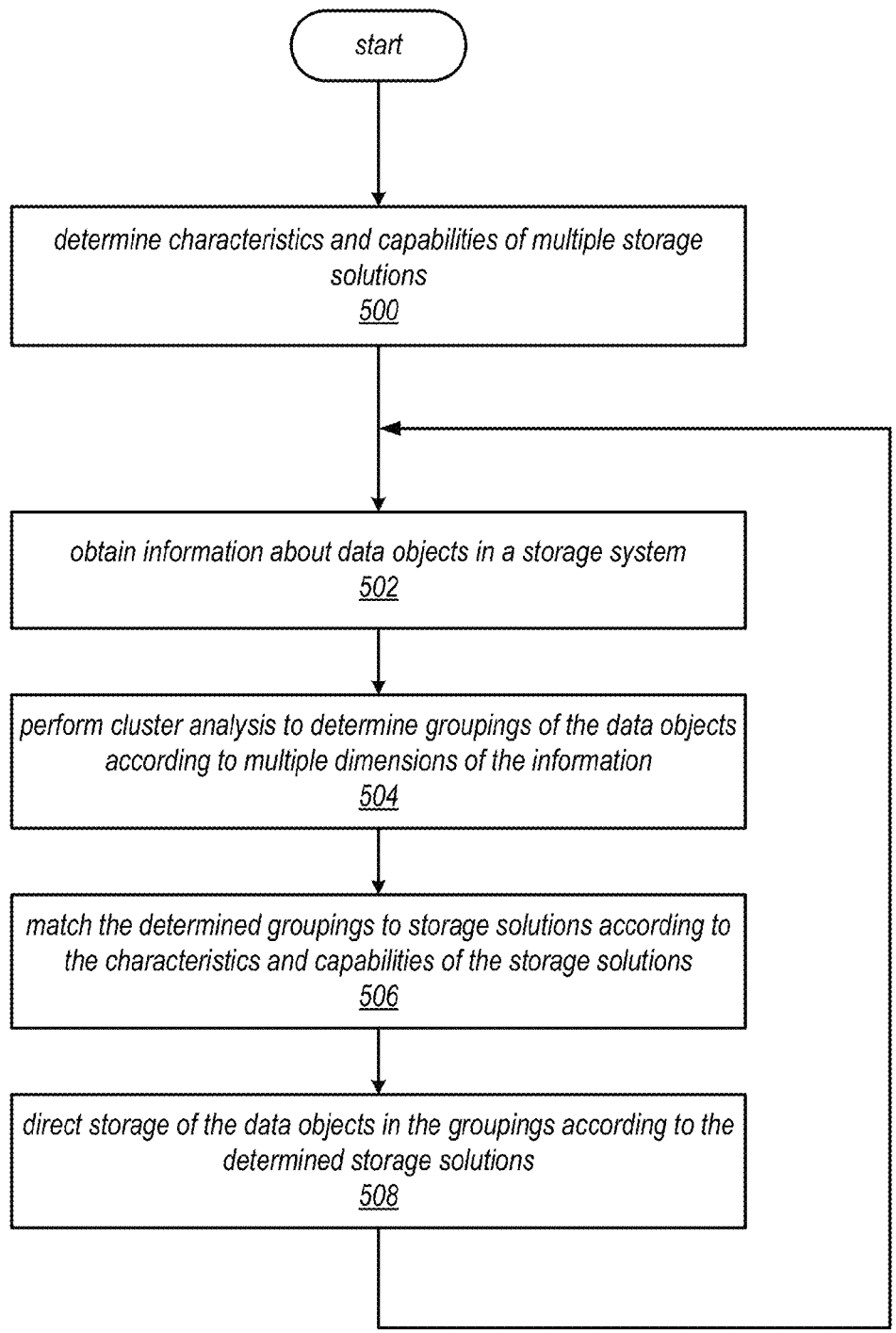
FIG. 5 a high-level flowchart of a multi-dimensional storage management method that uses a cluster analysis technique to match groupings of data objects to storage solutions, according to at least some embodiments.

FIG. 5 a high-level flowchart of a multi-dimensional storage management method that uses a cluster analysis technique to match groupings of data objects to storage solutions, according to at least some embodiments. As indicated at 500, characteristics and capabilities of multiple storage solutions in a data storage system may be determined. As indicated at 502, the storage management method obtains information about data objects in the data storage system. For example, the storage management method may collect the information from object metadata for data objects stored in the storage system that is maintained by storage application software. The data objects may be data objects already stored in the storage system or new data objects to be stored in the storage system. As indicated at 504, a cluster analysis technique may be applied to the obtained information to determine groupings of the data objects according to multiple dimensions of the information. As indicated at 506, the determined groupings may be matched to particular storage solutions according to the characteristics and capabilities of the storage solutions. As indicated at 508, the storage management method may direct storage of the data objects in the groupings according to the determined storage solutions. Upon obtaining new information about a data object or objects in the storage system, the storage management method may direct movement of the data object(s) from one storage solution to another storage solution according to an analysis including the new information.

Figure 6:
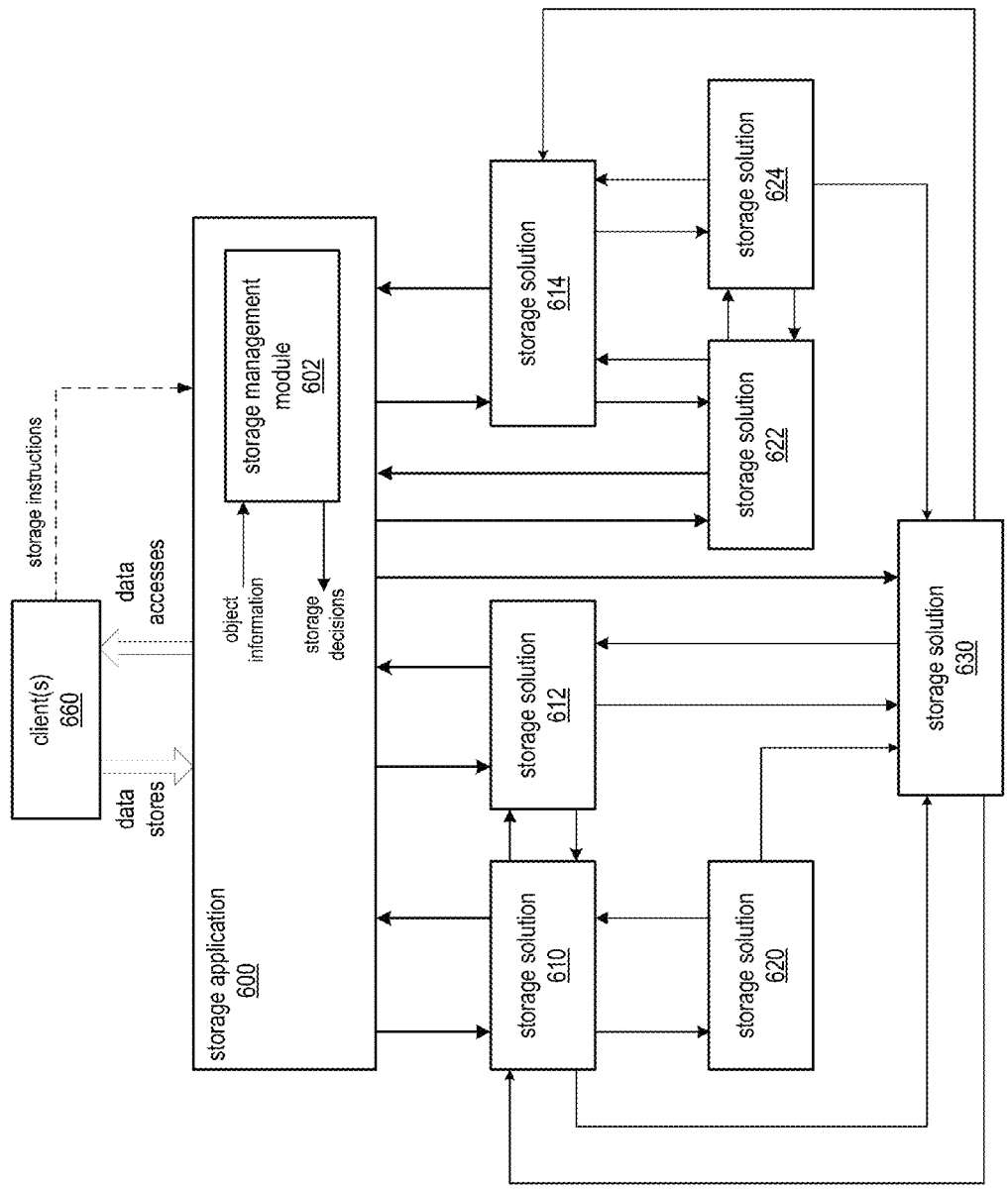
FIG. 6 is a block diagram that shows a logical view of an example storage system in which embodiments of a storage management method may be used to determine clusters of data objects and distribute the data objects among multiple storage solutions, according to at least some embodiments.

FIG. 6 is a block diagram that shows a logical view of an example storage system in which embodiments of a storage management method may be used to determine clusters of data objects and distribute the data objects among multiple storage solutions, according to at least some embodiments. A storage system may include a storage application 600 that may implement an embodiment of the storage management method as or in a storage management module 602. The storage application 600 may also maintain a store of metadata for data objects stored in the storage system. The storage application 600 may be implemented on one or more computing devices. An example computing device on which storage application 600 may be implemented is shown in FIG. 8.

The storage system may include multiple different storage solutions each with different characteristics and capabilities. This example shows seven different storage solutions 610, 612, 614, 620, 622, 624, and 630, and is not intended to be limiting. Storage solutions 610, 612, 614 may be relatively expensive storage solutions with relatively fast access times, such as flash memory technology, solid-state drive (SSD) technology devices, and high-speed magnetic disk technology devices. Storage solutions 620, 622, 624 may be less expensive storage solutions with slower access times such as commodity hard disk drive (HDD) technology devices and optical disk technology devices. Storage solution 630 may be a least expensive storage solution that may be expensive to access data from but that may provide the lowest cost per unit of storage. Storage solution 630 may, for example, involve storing data objects to magnetic tape, optical disk, or other removable persistent storage media, and transporting the media to and storing the media in a facility with low power requirements and a low or minimal level of climate control.

The various devices used in storage solutions 610, 612, 614, 620, 622, and 624 may vary in one or more characteristics and capabilities such as cost (e.g., per unit of storage), power consumption, capacity, throughput, speed of access, and environmental requirements. Other characteristics of the devices may differ as well, such as reliability metrics or statistics (e.g., failure rate or mean time between failures (MTBF)).

The storage application 600 may receive new data objects to be stored in the storage system from one or more clients 660. The storage application 600 may also receive requests to access stored data objects from the client(s) 660. In addition, the storage application 600 may internally generate some data objects, for example backup, replica, or redundancy data objects for client data stored in the storage system.

In some embodiments, a client 660 may provide storage instructions for particular new data objects or groups of new data objects being stored to the storage system, or alternatively for data objects previously stored to the storage system. The storage instructions may, for example, direct the storage application 600 to store the data object(s) to a particular storage solution or storage tier. Storage instructions from a client 660 may thus override decisions from the storage management module 602, or alternatively may be input to the storage management module 602 as additional information that may be considered when making storage decisions for the respective data object(s).

The storage management module 602 may collect information for data objects that are in or that are entering the storage system and, based on an analysis of multiple dimensions determined from the collected information (e.g., object age, access frequency, object types, object relationships, object metadata, user access patterns, etc.), determine groupings of the data objects. In at least some embodiments, a cluster analysis technique may be used to determine clusters or groupings of the data objects and match the clusters to particular storage solutions. Characteristics or requirements of the groupings of data objects may thus be examined and compared to characteristics and capabilities of the various storage solutions to match the groupings to particular storage solutions. This generates storage decisions by the storage management module 602 that may direct the storage application 600 and/or one or more of the storage solutions to store, move, or copy one or more data objects to a storage solution that has been determined for the grouping that the data objects belong to.

In some embodiments, new data objects stored to the storage system by client(s) 660 may be at least initially stored to a default storage solution, for example to one of storage solutions 610, 612, and 614. Alternatively, new objects may be stored to any one of the storage solutions based upon an analysis of information about the objects. The storage management module 602 may collect at least some information about the new data objects and determine storage solution(s) for the new data objects based on an analysis (e.g., a cluster analysis) of two or more dimensions of the information (note that the object age, one dimension that may be considered, is "new").

In at least some embodiments, the storage management module 602 may collect information for data objects previously stored to one or more of the various storage solutions and, based on an analysis (e.g., a cluster analysis) of two or more dimensions of the information, decide whether to move the data objects to another storage solution. Storage decisions may be generated by the storage management module 602 that may direct the storage application 600 and/or one or more of the storage solutions to store, move, or copy one or more data objects to a storage solution that has been determined for the grouping that the data objects belong to according to the analysis.

In FIG. 6, the thick arrows from the storage application 600 to several of the storage solutions represent examples of storing new data objects to the storage solutions under direction of the storage management module 602. The thick arrows from several of the storage solutions to the storage application 600 represent retrieving data objects from the storage solutions to satisfy client access requests. Note that, in at least some cases, data objects may be fetched from one storage solution and placed upon another storage solution prior to providing the data objects to the requesting client 660. For example, data objects may be fetched from storage solution 630 and copied to one of storage solutions 610, 612, or 614 prior to providing access to the data objects by a client 660. The thin arrows between the various storage solutions represent examples of moving or copying data objects between the storage solutions under direction of the storage management module 602.

In at least some embodiments, the storage solutions that may be used by a storage system may include one or more other storage systems or storage applications. FIG. 7 is a block diagram that shows a logical view of an example storage system in which embodiments of a storage management method may be used to direct the distribution of data objects among multiple storage solutions including another storage application. The storage system may include a storage application 700 that may implement an embodiment of the storage management method as or in a storage management module 702. The storage system may include one or more different storage solutions 710 (e.g., solid-state drive (SSD) technology devices, hard disk drive (HDD) technology devices, optical disk technology devices, etc.) each with different characteristics and capabilities. At least one of the storage solutions 710 may, for example, involve storing data objects to magnetic tape, optical disk, or other removable persistent storage media, and transporting the media to and storing the media in a facility with low power requirements and a low or minimal level of climate control.

The storage application 700 may receive new data objects to be stored from one or more clients 760A, and store the data objects to the storage solution(s) 710. The storage application 700 may also receive requests to access stored data objects from the client(s) 760A. In addition, the storage application 700 may internally generate some data objects, for example backup, replica, or redundancy data objects for client data stored in the storage system.

In this example, however, a second storage system that includes a storage application 770 and one or more storage solutions 780 may be used as an additional storage solution for storage application 700. The storage application 770 may receive new data objects to be stored from one or more clients 760B, and store the data objects to the storage solution(s) 780. The storage application 770 may also receive requests to access stored data objects from the client(s) 760B. In addition, the storage application 770 may receive data objects to be stored from storage application 700, and store the data objects to the storage solution(s) 780. The storage application 770 may also receive requests to access stored data objects from storage application 700. In at least some embodiments, storage application 770 may include or provide an API via which storage application 700 can write data to and read data from storage application 770.

The storage management module 702 of storage application 700 may collect information for data objects that are in or that are entering the storage system and, based on an analysis of multiple dimensions determined from the collected information (e.g., object age, access frequency, object types, object relationships, object metadata, user access patterns, etc.), determine groupings of the data objects. In at least some embodiments, a cluster analysis technique may be used to determine clusters or groupings of the data objects. Characteristics or requirements of the groupings of data objects may thus be examined and compared to characteristics and capabilities of the various storage solutions including storage solution(s) 710 and storage application 770 to match the groupings to particular storage solutions. This generates storage decisions by the storage management module 702 that may direct the storage application 700 to store, move, or copy one or more data objects to a storage solution 710 or to storage application 770 as determined for the grouping that the data objects belong to by the storage management module 702.

In some implementations, storage application 770 may also implement an embodiment of the storage management method as a storage management module to direct storing of data objects to storage solution(s) 780.

Illustrative System

In at least some embodiments, a server that implements a portion or all of the object storage methods and apparatus as described herein may include a general-purpose computer system that includes or is configured to access one or more computer-accessible media, such as computer system 2000 illustrated in FIG. 8. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for the object storage methods and apparatus, are shown stored within system memory 2020 as code 2024 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 7, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 7 for implementing embodiments of an object storage system and a storage management method. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A data storage system, comprising:
two or more distinct storage solutions for storing data objects in the data storage system, each storage solution implementing storage technology having distinct characteristics including cost per unit of storage and accessibility; and
one or more computing devices implementing a storage management module configured to:
obtain information about a plurality of data objects;
determine a plurality of groupings of the data objects based at least in part on a cluster analysis according to two or more dimensions of the obtained information, wherein the dimensions are independent of each other and wherein each grouping comprises at least two of the data objects;
determine a respective storage solution of the two or more storage solutions for each of the plurality of groupings of the data objects based at least in part on at least one characteristic of the storage solutions and at least in part on at least one characteristic of the groupings; and
direct storing of the data objects in the plurality of groupings to the respective storage solutions, wherein, for a first dimension of the two or more dimensions, a first grouping of data objects and a second grouping of the data objects of the plurality of groupings both share a first dimensional characteristic and are directed to different storage solutions, and wherein, for a second dimension of the two or more dimensions, a second dimensional characteristic of the first grouping of the data objects differs from a second dimensional characteristic of the second grouping of data objects, wherein one of the storage solutions is implemented with a lower power or climate requirement than another of the storage solutions.

2. The data storage system as recited in claim 1, wherein, to direct storage of the data objects in the plurality of groupings to the respective determined storage solutions, the storage management module is configured to:
direct storing of new data objects in the data storage system to one of the two or more storage solutions; and
direct moving of existing data objects in the data storage system from one or more of the two or more storage solutions to different ones of the two or more storage solutions.

3. The data storage system as recited in claim 1, wherein the two or more dimensions include two or more of age of the data objects, access frequency of the data objects, access patterns of the data objects, types of the data objects, relationships among the data objects, or metadata for the data objects.

4. The data storage system as recited in claim 1, wherein the storage technology implemented by the storage solutions includes two or more of flash memory technology, solid-state drive (SSD) technology, hard disk drive (HDD) technology, optical disk (OD) technology, or magnetic tape technology.

5. The data storage system as recited in claim 1, wherein one or more of the storage solutions are implemented in a powered and climate controlled data center, and wherein one of the storage solutions involves persistent storage media stored to a facility with lower power requirements and a lower level of climate control than the data center, and wherein, to direct storage of the data objects in the plurality of groupings to the respective determined storage solutions, the storage management module is configured to:
direct storing of one or more data objects to the storage media and direct storing the storage media in the facility; and
direct copying of at least one data object from the storage media in the facility to one of the one or more storage solutions in the data center, wherein an original of the at least one data object is maintained on the storage media in the facility.

6. The data storage system as recited in claim 1, wherein the data storage system is a storage service implemented on a network of a service provider, wherein the storage service provides virtualized storage to one or more clients via an application programming interface (API) to the storage service, and wherein the data objects include data objects stored to the virtualized storage by the one or more clients via the API to the storage service.

7. The data storage system of claim 1, wherein at least one grouping comprises at least three data objects.

8. The data storage system of claim 1, wherein the plurality of groupings of the data objects is determined based at least in part on the cluster analysis according to at least three dimensions of the obtained information.

9. A method, comprising:
performing, by a storage management module implemented by one or more computing devices:
analyzing objects in a storage system, using a cluster analysis technique according to a plurality of dimensions of information about the objects to determine groupings of the objects, wherein each grouping comprises a plurality of objects, wherein the dimensions are independent of each other;
determining a respective storage solution of a plurality of storage solutions for each grouping according to distinct characteristics of the storage solutions including cost per unit of storage and accessibility and based at least in part on dimensional characteristics of each grouping, wherein, for a first dimension of the plurality of dimensions of information, a first grouping of objects and a second grouping of objects of the groupings of objects share a first dimensional characteristic and are determined to be in different storage solutions, and wherein, for a second dimension of the plurality of dimensions of information, a second dimensional characteristic of the first grouping of objects differs from a second dimensional characteristic of the second grouping of objects; and
directing storing of the objects of at least the first and second groupings to the respective determined storage solutions in the storage system, wherein one of the determined storage solutions is implemented with a lower power or climate requirement than another of the determined storage solutions.

10. The method as recited in claim 9, wherein the storage system is a data storage system, wherein the objects are data objects, and wherein the storage solutions each implement different storage technology.

11. The method as recited in claim 10, wherein the storage technology implemented by the storage solutions includes two or more of flash memory technology, solid-state drive (SSD) technology, hard disk drive (HDD) technology, optical disk (OD) technology, or magnetic tape technology.

12. The method as recited in claim 9, wherein the plurality of dimensions include two or more of age of the objects, access frequency of the objects, access patterns of the objects, types of the objects, relationships among the objects, specified priorities for the objects, or object metadata for the objects.

13. The method as recited in claim 9, further comprising tracking access information for the objects over time, wherein the tracked access information includes one or more of date and time information for accesses of the objects or user access information for the objects, and wherein at least one of the plurality of dimensions is determined according to the tracked access information.

14. The method as recited in claim 9, wherein at least one grouping includes new objects in the storage system, and wherein said directing storing of the objects to the respective determined storage solutions in the storage system comprises directing storing of the new objects to one or more of the plurality of storage solutions.

15. The method as recited in claim 9, wherein at least one grouping includes existing objects in the plurality of storage solutions, and wherein said directing storing of the objects to the respective determined storage solutions in the storage system comprises directing moving of the existing objects to different ones of the plurality storage solutions.

16. The method as recited in claim 9, wherein one or more of the storage solutions are implemented in a powered and climate controlled facility, and wherein one of the storage solutions involves storing objects in a facility with lower power requirements and a lower level of climate control than the powered and climate controlled facility.

17. A non-transitory computer-accessible storage medium storing program instructions computer-executable to implement a storage management module configured to:
apply a cluster analysis technique according to two or more dimensions of information about data objects in a data storage system to determine groupings of the data objects, wherein each grouping comprises a plurality of data objects, wherein the dimensions are independent of each other;
determine a respective storage solution of a plurality of storage solutions for each grouping according to one or more distinct characteristics of the storage solutions, wherein, for a first dimension of the two or more dimensions of information about the data objects, a first grouping of data objects and a second grouping of data objects of the groupings of data objects share a first dimensional characteristic and are determined to be in different storage solutions, and wherein, for a second dimension of the two or more dimensions of information about the data objects, a second dimensional characteristic of the first grouping of data objects differs from a second dimensional characteristic of the second grouping of data objects; and
direct storing of at least the first and second groupings to the respective storage solutions in the data storage system, wherein one of the determined storage solutions is implemented with a lower power or climate requirement than another of the determined storage solutions.

18. The non-transitory computer-accessible storage medium as recited in claim 17, wherein the characteristics of the storage solutions include cost per unit of storage and access speed.

19. The non-transitory computer-accessible storage medium as recited in claim 17, wherein the data storage system is a multi-level cached memory system, wherein the storage solutions are different levels of the cached memory system.

20. The data storage system as recited in claim 17, wherein each storage solution implements different storage technology, wherein the storage technologies implemented by the storage solutions include two or more of flash memory technology, solid-state drive (SSD) technology, hard disk drive (HDD) technology, optical disk (OD) technology, or magnetic tape technology.

* * * * *